(12) United States Patent
Anquetil

(10) Patent No.: US 10,478,781 B2
(45) Date of Patent: Nov. 19, 2019

(54) SHAPES FOR TANGENTIAL FLOW SEPARATION SINGLE-CHANNEL TUBULAR ELEMENTS INCORPORATING TURBULENCE PROMOTERS, AND METHOD OF FABRICATION

(71) Applicant: TECHNOLOGIES AVANCEES ET MEMBRANES INDUSTRIELLES, Nyons (FR)

(72) Inventor: Jérôme Anquetil, Vaison la Romaine (FR)

(73) Assignee: TECHNOLOGIES AVANCEES ET MEMBRANES INDUSTRIELLES, Nyons (FR)

( * ) Notice: Subject to any disclaimer, the term of this patent is extended or adjusted under 35 U.S.C. 154(b) by 84 days.

(21) Appl. No.: 15/503,057

(22) PCT Filed: Jul. 21, 2015

(86) PCT No.: PCT/FR2015/051999
§ 371 (c)(1),
(2) Date: Feb. 10, 2017

(87) PCT Pub. No.: WO2016/024057
PCT Pub. Date: Feb. 18, 2016

(65) Prior Publication Data
US 2017/0246593 A1    Aug. 31, 2017

(30) Foreign Application Priority Data

Aug. 11, 2014 (FR) ..................................... 14 57743

(51) Int. Cl.
*B01D 65/08* (2006.01)
*B01D 46/24* (2006.01)
(Continued)

(52) U.S. Cl.
CPC ............. *B01D 65/08* (2013.01); *B01D 29/15* (2013.01); *B01D 63/061* (2013.01);
(Continued)

(58) Field of Classification Search
CPC ................. B01D 63/066; B01D 71/02; B01D 2321/2016; B01D 65/08; B01D 2315/10;
(Continued)

(56) References Cited

U.S. PATENT DOCUMENTS 4,390,355 A * 6/1983 Hammond, Jr. ... B01D 39/2075
210/510.1
5,785,851 A * 7/1998 Morris .................. B01D 29/031
210/489

(Continued)

FOREIGN PATENT DOCUMENTS

EP    0 813 445 B1    5/1999
FR    2 503 615 A1   10/1982
(Continued)

OTHER PUBLICATIONS

International Search Report dated Nov. 17, 2015 for Application No. PCT/FR2015/051999.
(Continued)

*Primary Examiner* — Ana M Fortuna
(74) *Attorney, Agent, or Firm* — Ladas & Parry LLP; Malcolm J. MacDonald

(57) ABSTRACT

The present invention relates to a tangential flow separator element for separating a fluid medium for treatment into a filtrate and a retentate, said separator element having a monolithic rigid porous support (2) of rectilinear structure and having a single channel (3) arranged therein for passing the flow of the fluid medium for treatment, the outside surface (5) of the support presenting a profile that is constant. According to the invention, the monolithic rigid (Continued)

porous support (2) defines obstacles (9) to the flow of the fluid for filtering, which obstacles extend from the inside wall ($3_1$) of said channel (3), are identical in material and porous texture to the support, and present continuity of material and of porous texture with the support, said obstacles (9) generating variations in the flow section of the channel.

22 Claims, 5 Drawing Sheets

(51) Int. Cl.
*C04B 38/06* (2006.01)
*C04B 35/46* (2006.01)
*C04B 35/565* (2006.01)
*C04B 35/622* (2006.01)
*C04B 35/634* (2006.01)
*B01D 29/15* (2006.01)
*B01D 69/02* (2006.01)
*B01D 69/04* (2006.01)
*B01D 69/10* (2006.01)
*B01D 63/06* (2006.01)
*B01D 29/11* (2006.01)
*B01D 71/02* (2006.01)
*B01D 71/06* (2006.01)

(52) U.S. Cl.
CPC .......... *B01D 63/063* (2013.01); *B01D 69/02* (2013.01); *B01D 69/046* (2013.01); *B01D 69/10* (2013.01); *B01D 29/11* (2013.01); *B01D 63/06* (2013.01); *B01D 63/062* (2013.01); *B01D 69/04* (2013.01); *B01D 71/02* (2013.01); *B01D 71/024* (2013.01); *B01D 71/06* (2013.01); *B01D 2321/20* (2013.01); *B01D 2321/2008* (2013.01); *B01D 2321/2016* (2013.01); *B01D 2325/02* (2013.01); *B01D 2325/028* (2013.01)

(58) Field of Classification Search
CPC .......... B01D 63/061; B01D 2255/1023; B01D 2201/62; B01J 35/04; B01J 37/0219; B01J 20/28045
See application file for complete search history.

(56) References Cited

U.S. PATENT DOCUMENTS

| 9,540,977 | B2* | 1/2017 | Sadaoka | ............... F01N 3/0222 |
| 2005/0076627 | A1* | 4/2005 | Itou | .................... B01D 39/2068 |
| | | | | 55/523 |
| 2011/0030829 | A1* | 2/2011 | Nilsson | .................... B01J 35/04 |
| | | | | 138/42 |
| 2017/0232393 | A1* | 8/2017 | Anquetil | .............. B01D 63/066 |
| | | | | 210/407 |
| 2017/0239622 | A1* | 8/2017 | Anquetil | ............. C04B 38/0009 |
| 2017/0246593 | A1* | 8/2017 | Anquetil | ................ B01D 65/08 |

FOREIGN PATENT DOCUMENTS

| FR | 2 503 616 A1 | 10/1982 |
| FR | 2 736 843 A1 | 1/1997 |
| GB | 2 223 690 A | 4/1990 |
| WO | 2012/032325 A1 | 3/2012 |
| WO | 2013/144399 A1 | 10/2013 |

OTHER PUBLICATIONS

International Search Report dated Nov. 17, 2015 for Application No. PCT/FR2015/051998.
Espacenet English abstract of FR 2 503 616 A1.
Espacenet English abstract of FR 2 736 843 A1.
Krstic, D. M., et al., "The effect of turbulence promoter on cross-flow microfiltration of skim milk", Journal of Membrane Science, vol. 208, 2002, pp. 303-314.
Jaffrin, M. Y., "Dynamic shear-enhanced membrane filtration: A review of rotating disks, rotating membranes and vibrating systems", Journal of Membrane Science, vol. 324, 2008, pp. 7-25.

* cited by examiner

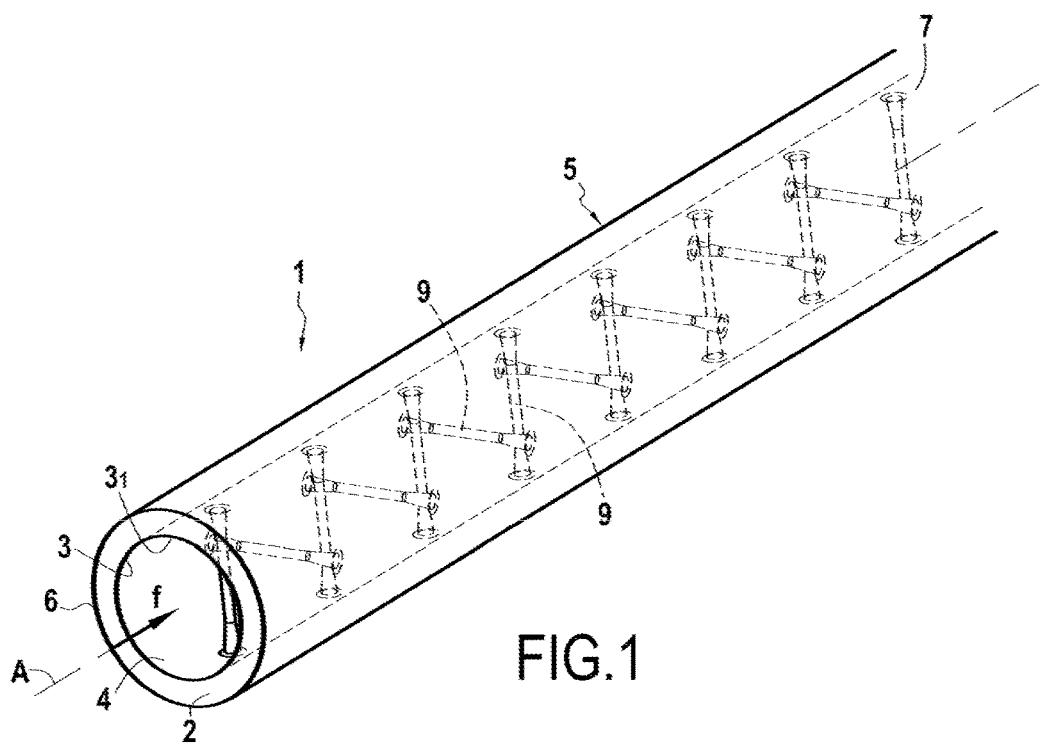
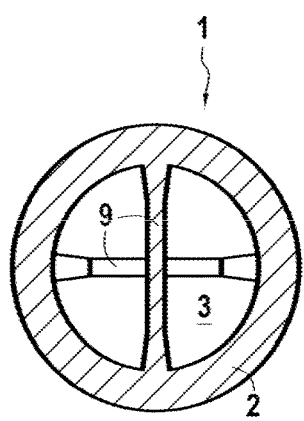
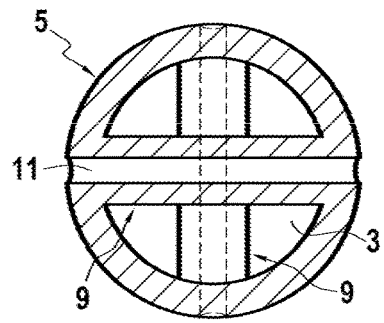
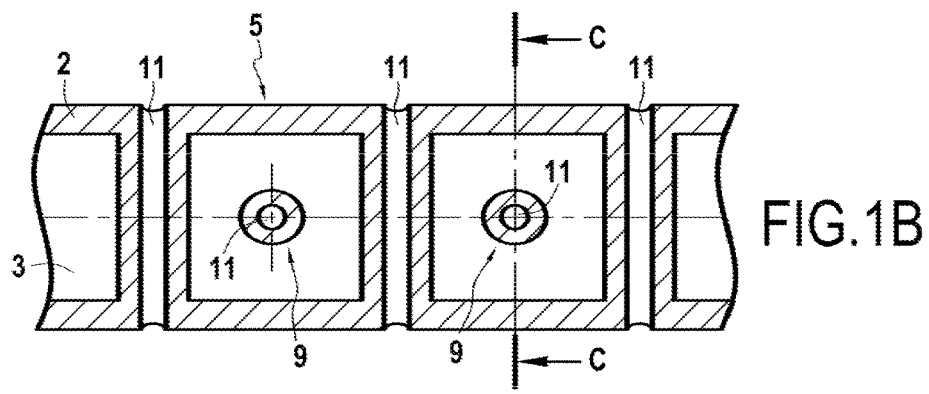

SHAPES FOR TANGENTIAL FLOW SEPARATION SINGLE-CHANNEL TUBULAR ELEMENTS INCORPORATING TURBULENCE PROMOTERS, AND METHOD OF FABRICATION

The present invention relates to the technical field of elements for tangential flow separation of a fluid medium for treatment so as to produce a filtrate and a retentate, which elements are commonly referred to as filter membranes. More precisely, the invention relates to novel shapes for porous supports having a single channel, which shapes serve to reduce, or even eliminate, problems of clogging, and also to an additive fabrication method of fabricating such supports, and to tangential flow separator elements including them.

Separation methods using membranes are used in numerous sectors, in particular in the environment for producing potable water and for treating industrial effluents, in the chemical, petrochemical, pharmaceutical, and agri-food industries, and in the field of biotechnology.

A membrane constitutes a selective barrier, and under the action of a transfer force, it serves to pass or to stop certain components of the medium for treatment. The components pass or stop as a result of their size relative to the size of the pores in the membrane, which then behaves as a filter. As a function of pore size, such techniques are referred to as "microfiltration", "ultrafiltration", or "nanofiltration".

There exist membranes having structures and textures that are different. In general, membranes are constituted by a porous support that provides the membrane with mechanical strength and that also gives it its shape and thus determines the filter area of the membrane. On this support, one or more separation-performing layers are deposited, each having a thickness of a few micrometers and referred to as "separator layers", "filter layers", or "active layers". During separation, the filtered fluid is transferred through the separator layer, and this fluid then spreads through the porous structure of the support in order to go towards the outside surface of the porous support. This portion of the fluid for treatment that has passed through the separation layer and the porous support is referred to as the "permeate" or "filtrate", and it is recovered by a collection chamber surrounding the membrane. The other portion is referred to as the "retentate", and, as a general rule, it is reinjected into the fluid for treatment upstream from the membrane, via a recirculation loop.

In conventional manner, the support is initially fabricated with the desired shape by extrusion, and is then sintered at a temperature and for a length of time that suffice to ensure the required strength, while conserving the desired texture of open and interconnected pores in the resulting ceramic. That method necessarily leads to one or more rectilinear channels being obtained, after which the separator layer(s) is/are subsequently deposited and sintered. Supports are traditionally tubular in shape having one or more rectilinear channels arranged parallel to the central axis of the support. In general, the inside surfaces of the channels are smooth and do not present any irregularities.

However, it has been found that filter membranes fabricated from supports having such shapes suffer from problems of clogging, and as a result they present performance that is limited in terms of flow rate. Specifically, small particles and macromolecules can be adsorbed on the surface of the separator layer or can become deposited thereon in the form of a gel or a deposit, and can even penetrate into the pores and block some of them.

All tangential separation making use of filter elements relies on the principle of selective transfer, with effectiveness that depends on the selectivity of the membrane (the active layer) and on the permeability (flow) of the filter element considered as a whole (support+active layer). Selectivity and permeability are determined by the characteristics of the active layer and of the filter element, but not only, since they can be reduced or limited by the appearance of a concentration polarization, a deposit, and/or blocking of the pores.

The phenomenon of concentration polarization occurs during a filtering operation when the macromolecules present in the liquid for treatment become concentrated at the membrane/solution interface, where they exert osmotic back-pressure opposing the separation force, or where they diffuse back into the core of the liquid for treatment in application of Fick's law. The concentration polarization phenomenon results from retained compounds accumulating in the vicinity of the membrane because of the permeation of the solvent.

The deposit appears during a filtering operation when the concentration of particles at the surface of the membrane increases sufficiently to cause a condensed phase to appear in the form of a gel or a cohesive deposit, giving rise to hydraulic resistance in addition to the resistance of the membrane.

Pore blocking occurs when there is intrusion of particles of sizes smaller than or equal to the sizes of the pores, thereby leading to a reduction in the filtering area.

Clogging, and its reversibility or non-reversibility, are phenomena that are complex and that depend on the filter element, and in particular on its separator layers, on the liquid for treatment, and on operating parameters.

Clogging is a major brake on the economic attractiveness of filtering, since, when designing filter installations, firstly it leads to increasing the installed areas in order to satisfy requirements in terms of volumes to be treated, and secondly it makes it necessary to use specific technical means for remedying clogging a posteriori, such as periodic cleaning cycles using detergents or back washing.

In the prior art, proposals have already been made to reduce the clogging phenomenon by creating turbulent flow conditions inside the channel of a filter element.

Initially, proposals were made to introduce turbulence-creating devices into tubular filter elements. Reference may be made in particular to D. M. Krstic et al., Journal of Membrane Science 208 (2002) pp. 303-314. By limiting clogging, those devices serve to improve the flow of permeate, and consequently the effectiveness of filtering. Nevertheless, installing and attaching such devices in tubular elements are operations that are difficult and complex. Furthermore, they give rise to troublesome vibration that is harmful for the reliability of the equipment.

Other rather complex systems have also been proposed by M. Y. Jaffrin in Journal of Membrane Science 324 (2008) pp. 7-25, and they make use of circular membranes and a central module that rotate relative to one another in order to create turbulence. That work has nevertheless demonstrated that the resulting large rate of shear serves to reduce clogging.

Other solutions consist in modifying the internal shape of the tubular element. Patent FR 2 503 615 describes cylindrical tubes for filtering gas mixtures injected under pressure, the inside walls of the tubes having indentations for creating turbulence that prevents one of the gas phases from accumulating on the wall of the tube and that improves separation by gaseous diffusion. The indentations are formed by causing the tubes leaving the extrusion die to pass between rollers or tools that deform the tubes locally over the entire thickness of their walls. Patent FR 2 503 616 describes a method based on the same principle, consisting in deforming the wall of the tube on leaving the extrusion die by applying knurling wheels arranged facing each other on either side of the tube, or in alternating positions.

In those two documents, after the prior step of extruding the single-channel tube, a final shaping step is thus performed by plastic deformation so as to obtain indentations inside the single channel by pressing a rotary punch or the like against the outside surface of the tube. Obtaining such "indentations" is easier or more difficult depending on the ductility of the material, i.e. its aptitude for being subjected to permanent deformation without breaking. However, the compounds that are used for fabricating ceramic membranes do not present good ductility: they are easily shaped by extrusion, but in general they present breaking elongation of less than 5%. Furthermore, with such techniques, it is possible to obtain indentations of small size only. Finally, deformations made throughout the thickness of the tube lead to high levels of stress in the material and to risks of cracking, thereby greatly degrading mechanical strength.

It is also possible to mention application FR 2 736 843, which proposes porous tubes having a single channel with walls that include indentations, even though the peripheral wall of the support is smooth. To do this, the porous tube is shaped by means of an extrusion die that includes a cylindrical pin arranged along its axis, the pin or the outlet of the extrusion die being mounted to rotate and being of section that is not circular. Once more, that fabrication technique is limited to certain types of indentation, namely to indentations that are continuous from one end to the other of the separator element, such that there is no variation along the longitudinal axis of the channel in the area, in the shape, or in the dimensions of the through right section of said channel.

On the same lines, patent EP 0 813 445 describes a filter element with one or more channels, each including a helical groove that may be a single-, double-, or triple-start groove. That filter element presents the same drawbacks as the filter element described in document FR 2 736 843.

In this context, the present invention proposes providing novel filter elements and a fabrication technique adapted to making them, which filter elements present a single-channel structure and a shape that is adapted to reducing clogging phenomena, or even to eliminating them.

An object of the invention is to provide novel filter elements of shape that can be modulated at will, so as to create high surface shear stresses and intense turbulence inside the channels, but without presenting the drawbacks of prior art solutions.

In order to achieve such an object, the invention provides a tangential flow separator element for separating a fluid medium for treatment into a filtrate and a retentate, said separator element comprising a monolithic rigid porous support of rectilinear structure with a single channel formed therein for passing a flow of the fluid medium for treatment between an inlet and an outlet for the retentate, in order to recover a filtrate from the peripheral surface of the support, the outside surface of the support presenting a profile that is constant.

According to the invention, the monolithic rigid porous support defines obstacles to the flow of the fluid for filtering, which obstacles extend from the inside wall of said channel, are identical in material and porous texture to the support, and present continuity of material and of porous texture with the support, said obstacles generating variations in the flow section of the channel.

In the context of the present invention, a flow section of a channel is defined as being the right section of said channel taken perpendicularly to the longitudinal axis of the channel. This right section of the channel is considered as varying along its longitudinal axis providing at least one of the following three criteria varies:
  the area of the right section of the channel;
  the shape of the right section of the channel; and
  the dimensions of the right section of the channel.

Furthermore, the element of the invention may also present in combination at least one and/or others of the following additional characteristics:
  at least one separator layer deposited continuously on the inside wall of the channel and completely covering the obstacles;
  the obstacles generate variations in the flow section of the channel if at least one of the following three criteria varies, namely: the area, the shape, and the dimensions of the right section of the channel;
  the number, the shape, and the dimensions of the obstacles are adapted to encourage the flow to take place under turbulent conditions and to cause sufficient shear and recirculation to appear to be capable of reducing, or even eliminating, deposits and pore clogging on the inside wall of the channel;
  the obstacles correspond to discontinuous portions in relief formed on the inside wall of the channel;
  the obstacles correspond to portions in relief formed on the inside wall of the channel, which portions in relief extend continuously between the inlet and the outlet;
  the discontinuous obstacles extend transversely inside the channel, from one portion of the channel to another;
  the obstacles define respective internal ducts for passing a flow of permeate and leading to the peripheral surface of the support;
  relative to the maximum flow section of the channel, the obstacles generate a reduction in the area of the flow section lying in the range 1% to 50%;
  the obstacles have their surfaces that are for coming into contact with the fluid for filtering and that face towards the inlet sloping in the flow direction of the fluid for treatment;
  the porous support is made of a material that is organic or inorganic;
  a porous support and at least one separator layer continuously deposited on the inside wall of the channel and completely covering the obstacles, each being constituted of a ceramic selected from: oxides, nitrides, carbides, and other ceramic materials, and mixtures thereof, and in particular titanium, aluminum, and zirconium oxides, and a mixture thereof, titanium nitride, aluminum nitride, boron nitride, and silicon carbide, optionally mixed with another ceramic material;
  the support presents a mean pore diameter lying in the range 4 micrometers (μm) to 40 μm; and
  the mean pore diameter corresponds to a d50 value for the volume distribution at which 50% of the total volume of the pores corresponds to the volume of the pores having a diameter less than the d50 value; the volume distribution being obtained by mercury penetration, e.g. by using the technique described in ISO standard 15901-1:2005.

The invention also provides a method of making separator elements in accordance with the invention.

According to the invention, the method of fabricating a tangential flow separator element wherein the three-dimensional structure of the support is made by forming individual plies that are superposed and successively bonded to one another so as to build up the desired three-dimensional shape progressively.

The tangential flow separator elements obtained by the method defined in the context of the invention lead to building up the three-dimensional structure of the support. It should be observed that this structure is revealed by viewing the various plies by optical microscopy or by scanning electron microscopy.

Naturally, it is desirable for the boundaries between the various plies to be as tenuous as possible.

Furthermore, the method of the invention may also consist in combating at least one and/or others of the following additional characteristics:
  in making the three-dimensional structure by repeating the following steps:
    making a continuous bed of a material that is to form the porous support, the bed being of constant thickness over an area greater than the section of said porous support at the ply;
    locally consolidating some of the material to form a pattern that is determined for each ply, so as to create the individual ply while simultaneously bonding the individual ply has made in this way to the preceding ply;
  in making continuous beds of solid material in the form of a powder or of liquid material such as photopolymerizable resins;
  in making a continuous bed of a solid material in the form of a powder that is organic or inorganic;
  in making a continuous bed of a medium in the form of a photopolymerizable liquid precursor having an inorganic powder disposed therein;
  each ply is made by continuous or discontinuous melting of a string of a thermofusible solid precursor that is either a thermofusible organic polymer used on its own with an organic support and an organic layer, or else a mixture of a thermofusible organic polymer and of a ceramic inorganic powder, with a support of inorganic nature; and
  in creating successive beads of material by spraying a powder that is melted in a laser beam.

The following description, given with reference to the accompanying figures, enables the invention to be better understood.

FIG. 1 is a perspective view of an embodiment of a separator element in accordance with the invention in which the obstacles are bars extending diametrically with successive angular offsets of 90°.

FIG. 1A is a cross-section view of the separator element shown in FIG. 1.

FIG. 1B is a longitudinal section view of a variant embodiment of the separator element shown in FIG. 1, and showing the presence of permeate recovery ducts inside the obstacles.

FIG. 1C is a cross-section view of the separator element on lines C-C of FIG. 1B.

Figure 2:
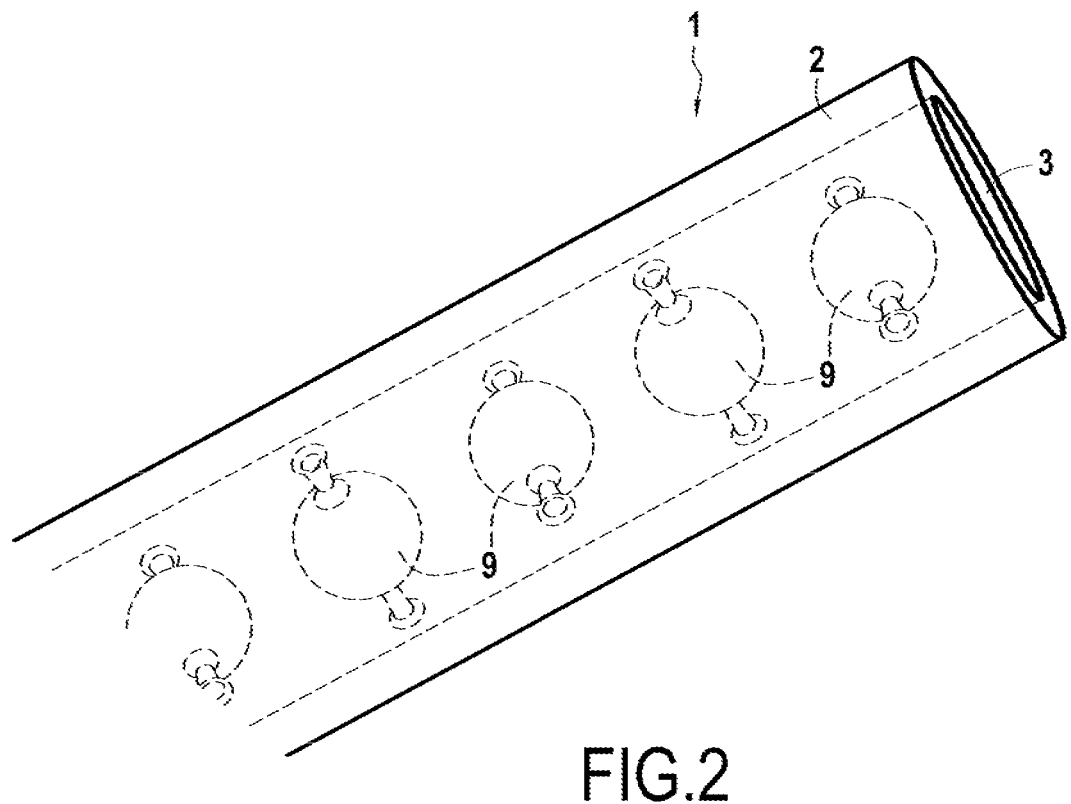
FIG. 2 is a perspective view of an embodiment of a separator element in accordance with the invention in which the obstacles are spherical elements regularly positioned at the center of the channel and formed monolithically with the separator element as a whole by arms extending diametrically with successive angular offsets of 90°.

As a preliminary point, definitions are given of a few terms used in the context of the invention.

The term "mean grain size" is used to mean the d50 value for a volume distribution at which 50% of the total volume of the grains corresponds to the volume of grains having a diameter less than this d50 value. The volume distribution is the curve (analytic function) plotting grain volume frequencies as a function of grain diameter. The d50 value corresponds to the median between two equal portions of the area situated under the frequency curve as obtained by laser diffraction grain size, which is the reference technique used in the context of the invention for measuring the mean diameter of grains. Concerning the technique for measuring d50, reference may be made in particular to:
  ISO standard 13320:2009, concerning the laser grain size measurement technique;
  ISO standard 14488:2007, concerning techniques for sampling the powder under analysis; and
  ISO standard 14887:2000, concerning reproducibly dispersing the powder sample in the liquid prior to taking a measurement by laser grain size.

The term "mean pore diameter" is used to mean the d50 value of a volume distribution for which 50% of the total volume of the pores corresponds to the volume of pause having a diameter less than this d50 value. The volume distribution is the curve (analytic function) plotting grain volume frequencies as a function of pore diameter. The d50 value corresponds to the median between two equal portions of the area situated under the frequency curve obtained by mercury penetration for mean diameters of the order of a few nanometers (nm) or, for pores of smaller diameter, by adsorption of a gas, in particular $N_2$, with these two techniques being used as references in the context of the invention for measuring the mean diameter of the pores.

In particular, it is possible to use the techniques described in:
- ISO standard 15901-1:2005, for the mercury penetration measurement technique; and
- ISO standards 15901-2:2006 and 15901-3:2007, for the gas and adsorption measurement technique.

Typically, the support presents a mean pore diameter lying in the range 4 µm to 40 µm.

The invention proposes tangential flow separator elements for separating a fluid medium for treatment into a filtrate and a retentate, where such an element comprises a single-channel monolithic porous support of shape that is selected to define obstacles on the inside wall of the channel in order to impede the flow of the fluid for filtering. Such monolithic supports in which the obstacles form an integral portion of the monolithic porous structure cannot be made by the techniques proposed in the prior art. In the context of the invention, it is proposed to make such monolithic porous supports, and possibly an entire separator element (i.e. including the separator layers), by using an additive fabrication technique.

In the context of the invention, the separator elements are for separating a fluid medium by tangential filtration, and they are commonly referred to as filter membranes. Such separator elements comprise a porous support having arranged therein a single flow channel for the fluid that is to be filtered. Conventionally, the support is tubular in shape. The flow channel has an inlet for the fluid medium for treatment and an outlet for the retentate, the inlet and the outlet being located at respective ends of the support.

In such separator elements, the body constituting the support presents a texture that is porous. This porous texture is characterized by the mean diameter of the pores, as deduced from their distribution as measured by mercury penetration porometry.

The porous texture of the support is open and forms an array of interconnected pores, thus enabling the fluid filtered by the filter separator layer to pass through the porous support and be recovered at its periphery. It is common practice to measure the water permeability of the support in order to qualify the hydraulic resistance of the support. Specifically, in a porous medium, the steady flow of an incompressible viscous fluid is governed by Darcy's law. The speed of the fluid is proportional to the pressure gradient and inversely proportional to the dynamic viscosity of the fluid, via a characteristic parameter known as "permeability", and by way of example, it can be measured in accordance with French standard NF X 45-101 of December 1996.

The permeate is thus recovered from the peripheral surface of the porous support. The wall of the channel is continuously covered by at least one filter separator layer that serves to filter the fluid medium for treatment. By definition, the filter separator layer must present a mean pore diameter that is smaller than that of the support. The separator layer defines the surface of the tangential flow separator element that is to come into contact with the fluid for treatment and over which the fluid for treatment is to flow.

FIG. 1 shows an example of such a tangential flow separator element 1 of tubular shape in which a single channel is arranged. The tangential flow separator element 1 comprises a porous support 2 made to have an elongate shape extending along a longitudinal central axis A, which is why the structure of the porous support is said to be rectilinear. The porous support 2 shown in FIG. 1 possesses a right cross-section that is circular and thus presents an outside surface 5 that is cylindrical, however its right cross-section could be of any shape, e.g. polygonal. The term "section" is used to designate the shape defined by a volume being intersected by a plane, with the right section of a cylinder being the shape defined by the cylinder being intersected by a plane that is perpendicular to the longitudinal central axis.

According to a characteristic of the invention, the outside or peripheral surface 5 of the support presents a profile that is constant. In other words, the outside surface 5 does not present any surface irregularity other than irregularities generated by the intrinsic porosity of the material or generated by surface roughness inherent to the shaping method proper. Thus, the outside surface 5 does not possess any deformations or indentations. It should be recalled that the profile corresponds to the outside shape of the porous support 2 taken in a transverse plane containing the longitudinal central axis A. In the example shown, the profile of the support 2 is rectilinear and constant from the inlet to the outlet. In other words, a profile that is constant means that all of the outside generator lines parallel to the central axis of the support are straight lines that are all parallel to one another.

The porous support 2 is arranged to have a channel 3 that extends parallel to the axis A of the support. The channel 3 presents a surface that is covered by at least one separator layer 4 that is to come into contact with the fluid medium for treatment flowing inside the channel 3. A portion of the fluid medium passes through the separator layer 4 and the porous support 2, such that this treated portion of the fluid, referred to as the "permeate", flows through the outside surface 5 of the porous support. The fluid for filtering flows between an inlet 6 situated at one end of the tubular support and an outlet 7 situated at the other end, in a flow direction represented by arrow f.

Typically, the thicknesses of the filter separator layers lie in the range 1 µm to 100 µm. Naturally, to be able to perform their separation function and act as an active layer, the separator layers present a mean pore diameter that is smaller than the mean pore diameter of the support. Usually, the pore diameter of the filter separator layers is less than the mean pore diameter of the support by a factor of at least 3, and preferably by a factor of at least 5.

The concepts of a separator layer for microfiltration, for ultrafiltration, and for nanofiltration are well known to the person skilled in the art. It is generally accepted that:
- microfiltration separator layers present a mean pore diameter lying in the range 0.1 µm to 2 µm;
- ultrafiltration separator layers present a mean pore diameter lying in the range 0.1 µm to 0.01 µm; and
- nanofiltration separator layers present a mean pore diameter lying in the range 0.5 nm to 2 nm.

It is possible for this so-called "active" micro- or ultrafiltration layer to be deposited directly on the porous support (for a single layer separator layer), or indeed for it to be deposited on an intermediate layer of smaller mean pore diameter, itself being deposited directly on the porous support (for a single-layer separator layer). By way of example, the separator layer may be based on, or it may be constituted exclusively by, one or more metallic oxides, carbides, or nitrides, or indeed other ceramics. In particular, the separator layer may be based on, or may be constituted exclusively by, $TiO_2$, $Al_2O_3$, and $ZrO_2$, singly or in a mixture.

According to an essential characteristic of the invention, the support is shaped to have a series of obstacles 9, starting from the inside wall $3_1$ of the channel 3, which obstacles are suitable for generating disturbances in the flow and for generating shear forces of amplitude that is sufficient to cause recirculations to appear, thereby limiting clogging phenomena, or indeed even totally eliminating them. The obstacles 9 form integral portions of the monolithic porous support, i.e. they come specifically from the shape given to the porous support and they are not in any way separate fittings. Together, the support and the obstacles form a single porous monolithic element, without connections, interfaces, or joints of any kind. The material and the porous texture of the obstacles and of the porous support are identical, and the material and the porous texture are continuous between the obstacles and the porous support. Thus, the obstacles 9 are mechanically integral with the support, and the obstacles 9 and the support present the same chemical resistance. The obstacles 9 are completely covered by the separator layer, such that they do not reduce, but on the contrary increase, the filter area of the separator element.

The identical nature of the materials between the obstacles 9 and the support 2 means that they are chemically identical at all points, i.e. they are identical in the porous support and in the obstacles.

The identical porous texture covers the porosity, the tortuosity, and the size and distribution of the pores, which are identical at all points of the element, i.e. in the obstacles and in the porous support.

Material continuity means that all points of the element are identical in chemical nature, i.e. there is no chemical discontinuity between an obstacle and the porous support.

Continuity of porous texture means that the porosity, the tortuosity, and the size and distribution of the pores are identical at all points in the element, such that there is no discontinuity of porous texture between an obstacle and the porous support.

The role of the obstacles 9 is to lie on the path of the fluid flowing inside the channel. The obstacles 9 hinder or disturb the passage of the fluid for treatment, which has to flow around them, since they lie between two positions taken along the longitudinal axis A of the channel. The obstacles thus give rise to increases in the flow speed of the liquid in register with each of them, thereby generating high levels of surface shear stress and zones of turbulence where clogging phenomena are reduced, or indeed eliminated. The obstacles act as turbulence promoters. The number, the shape, and the dimensions of the obstacles are adapted to encourage the flow to take place under turbulent conditions and to cause sufficient shear and recirculation to appear to be capable of reducing, or even eliminating, deposits and pore clogging on the inside wall of the channel.

In preferred manner, in order to facilitate appropriate deposition of the separator layer on the obstacle, the obstacle should be rounded in shape. In particular, the obstacle 9 may project from the wall, either perpendicularly to the wall, or with a connection angle of less than 90°, or else via connection fillets presenting radii of curvature lying in the range 0.1 times to 0.9 times the height of the obstacle 9.

The obstacles 9 may be present at intervals that are regular or irregular. Two of the obstacles 9 may be present in a given right section of the channel, or more than two obstacles if their shape and their size make this possible. The novel support shapes envisaged in the present invention present a repetition of one or more obstacles starting from the wall of the channel to which the obstacles are secured. The obstacles may extend in continuous or discontinuous manner in the flow direction of the fluid, but in all circumstances they give rise to variation in the flow section inside the channel, thereby enabling turbulence to be increased. It should be recalled that in the meaning of the invention, the flow section of the channel is considered as varying if the area of the right section of the channel varies along the longitudinal axis of the channel and/or if the shape of the right section of the channel varies along the longitudinal axis of the channel and/or if the dimensions of the right section of the channel vary along the longitudinal axis of the channel, the right section of the channel being taken perpendicularly to the longitudinal axis of the channel.

For example, relative to the maximum flow section of the channel 3, the obstacles 9 generate a reduction in the area of the flow section lying in the range 1% to 50%.

In a circular channel having a diameter of 20 millimeters (mm), a cylindrical diametrical obstacle (rod) having a diameter of 4 mm (FIGS. 1 and 1A to 1C) would lead to a reduction in the area of the flow section of the channel, relative to its maximum flow section, of the order of 25%.

In a circular channel having a diameter of 20 mm, a surface obstacle in the form of a circular segment of the "small ridge" type (FIG. 5 or 6) and having a height of 1 mm would lead to a reduction in the area of the flow section of the channel, relative to its maximum flow section, of the order of 1.7%.

In a circular channel having a diameter of 20 mm, a surface obstacle in the form of a circular segment of the "small ridge" type (FIG. 5 or 6) and having a height of 3 mm would lead to a reduction in the area of the flow section of the channel, relative to its maximum flow section, of the order of 9%.

In a circular channel having a diameter of 20 mm, a surface obstacle in the form of a circular segment of the "small ridge" type (FIG. 5 or 6) and having a height of 10 mm would lead to a reduction in the area of the flow section of the channel, relative to its maximum flow section, equal to 50%.

In a circular channel having a diameter of 20 mm, it is necessary to have an axial obstacle in the form of a sphere (FIG. 2 or 2A) having a diameter of 14 mm in order to reduce the flow section area of the channel, relative to its maximum flow section, by 50%.

In a variant implementation, it should be observed that the obstacles 9 have their surfaces that are for coming into contact with the fluid for filtering and that face towards the inlet sloping in the flow direction of the fluid for treatment.

In particular, the inside wall of the channel incorporating the obstacles 9 may have portions in relief such as recesses, bulges, fluting, stripes, and/or any other shape suitable for acting as a corresponding number of obstacles for promoting turbulence when the fluid is flowing inside said channel.

Preferably, the obstacles 9 present a height taken along a diametrical direction perpendicular to the longitudinal axis A that is greater than their width divided by two (this width being taken along the other diametrical direction perpendicular to the longitudinal axis A).

In the embodiment shown in FIGS. 1 and 1A, the obstacles 9 are made in the form of bars or rods extending diametrically inside the channel 3 from two facing portions of its wall. In the example shown, the obstacles 9 extend along the diameter of the channel, however it is clear that the obstacles could extend inside the channel from one portion of the wall to another at a level that is different from a diameter of the channel. The obstacles 9 are distributed inside the channel 3 along the longitudinal axis A of the support, e.g. at regular intervals, being offset from one another by a constant determined angular value. In the example shown in FIGS. 1 and 1A, the obstacles 9 are angularly offset from one another by a 90° angle. Naturally, the angular alternation between the obstacles 9 could present some other value. Likewise, the pitch between the obstacles 9 taken along the longitudinal axis A could vary.

In the example shown, each bar 9 possesses a right cross section that is substantially constant over the major portion of its length, and is connected to the inside wall $3_1$ at each of its ends by a portion that flares to the inside wall.

Naturally, an embodiment could be provided in which the bars extend over a fraction only of the diameter, each bar being connected to the inside wall $3_1$ of the support at one end only.

Figure 2A:
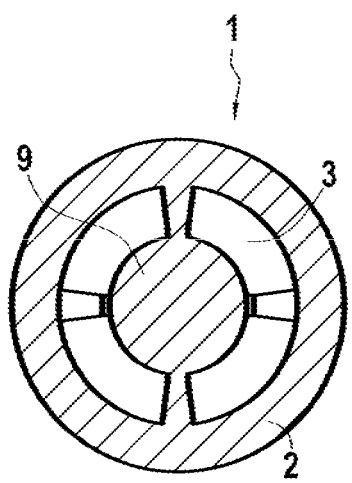
FIG. 2A is a cross-section view of the separator element shown in FIG. 2.

On the same lines, these diametrical obstacles 9 could be of shapes different from the profile shown in FIGS. 1 and 1A. By way of example, FIGS. 2 and 2A show obstacles 9 extending diametrically inside the channel 3 and presenting a shape that is spherical. Thus, by way of example, each obstacle 9 comprises a sphere in its central portion, which is attached to two symmetrically opposite portions of the wall via two respective connection arms. Naturally, the sphere presents a section that is smaller than the through section of the channel so as to enable the fluid for treatment to go past it. This spherical shape for the obstacle 9 may be replaced by a shape that is egg-shaped, oblong, etc.

As explained with reference to FIG. 1, the obstacles 9 are arranged inside the channel A at intervals that are regular or irregular, and with an angular offset that is determined, e.g. equal to 90° in the example shown in FIG. 2.

In the preceding examples, the obstacles 9 extend transversely or diametrically inside the channel 3 being connected at each of their ends to two respective portions of the wall of the channel 3. In an advantageous variant embodiment shown in FIGS. 1B and 1C, the obstacles 9 that extend transversely from the wall of the channel may include respective ducts 11 arranged inside the obstacle so as to open out in the peripheral surface 5. The ducts 11 serve to recover the permeate that has passed through the separator layer and the porous material constituting the obstacle proper, and to allow it to flow so that it is transferred directly to the outside of the support 2.

FIGS. 3, 3A, 3B, and 3C show another embodiment in which the obstacles 9 extend axially inside the channel 3, being connected from time to time firstly to the inside wall $3_1$ of the support by connection bridges $9_1$, and secondly to each neighbouring obstacle situated upstream and/or downstream from said obstacle. The obstacles 9 thus extend as an axial string.

Figure 3:
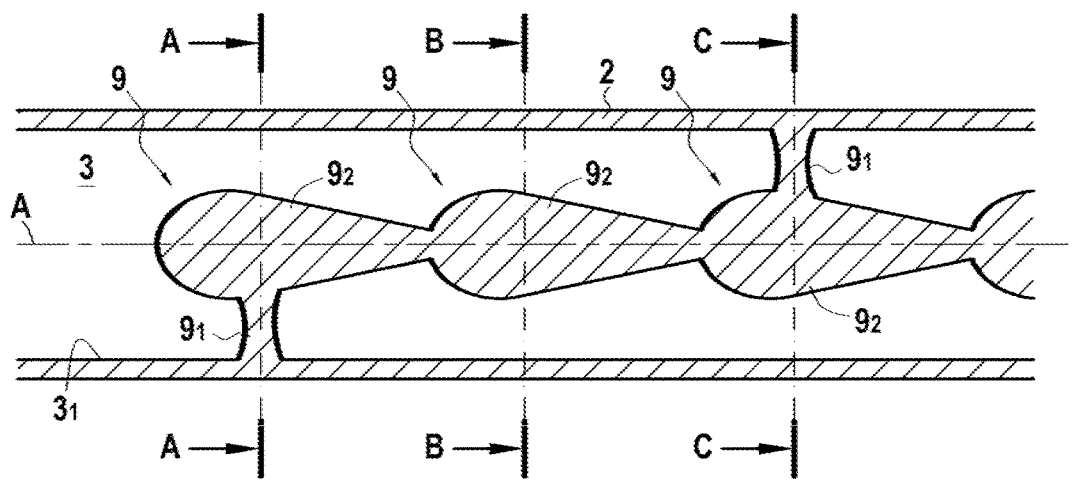
FIG. 3 is a longitudinal section of a separator element in accordance with the invention in which the obstacles are elements of oblong shape extending axially and being held by bridges that are angularly offset.
Figure 3A:
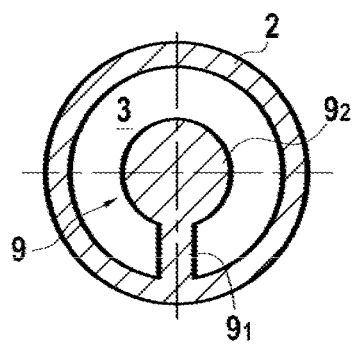
FIGS. 3A to 3C are cross sections of the separator element shown in FIG. 3 and taken respectively on lines A-A, B-B, and C-C.
Figure 3B:
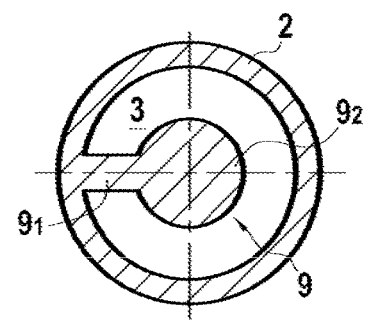
Figure 3C:
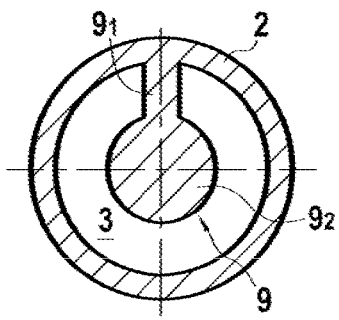

The obstacles 9 comprise an axial portion $9_2$ presenting various shapes such as egg-shaped, oblong, spherical, helical, etc., or in the form of a teardrop, as shown in FIG. 3. Each obstacle 9 is connected to the support by a connection bridge $9_1$ between the axial portion $9_2$ and the inside wall $3_1$ of the support. Preferably, depending on their positioning along the longitudinal axis A, the connection bridges $9_1$ are offset angularly by a determined value, which is equal to 90° in the example shown in FIGS. 3A to 3C. As mentioned above, each obstacle 9 is connected to one or more neighbouring obstacles via their axial portions $9_2$.

Figure 4:
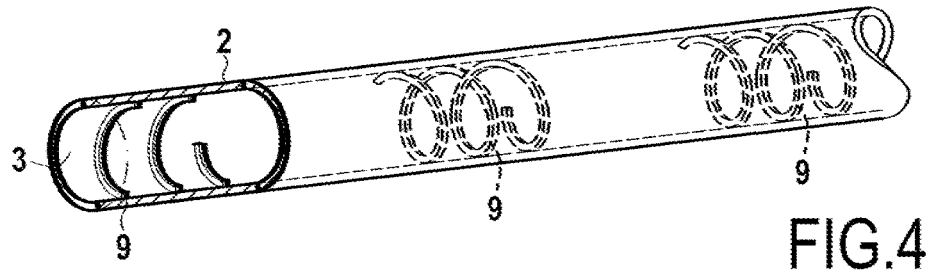
FIG. 4 is an exploded perspective view showing an embodiment of a separator element in which the obstacles are segments of a surface helix.

FIG. 4 shows another variant embodiment in which the obstacles 9 are in the form of a surface helix, i.e. a helix arranged on the inside wall $3_1$ of the support. In the example shown, the separator element has a series of obstacles 9, each formed by a segment of a helix, with the obstacles being distributed regularly along the longitudinal axis A. Each obstacle 9 is in the form of a recessed or projecting indentation formed on the wall $3_1$ of the support. Provision may be made to arrange a plurality of obstacles 9 in the form of discontinuous helices that are angularly offset from one another, or in the form of continuous helices with pitches and/or heights that are different.

Figure 5:
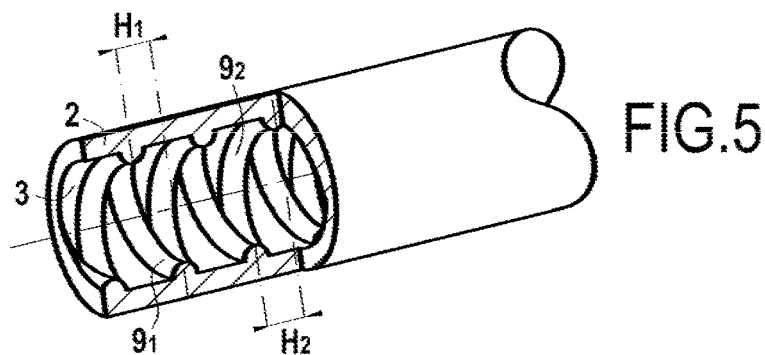
FIG. 5 is a longitudinal view, partially in section, showing the channel of a separator element in which the obstacles are continuous surface helices with reversed handedness and for which the heights and the periods may vary.

FIG. 5 shows an embodiment of a channel of a separator element in which the obstacles are two surface helices $9_1$, $9_2$ that cross, that are oppositely handed, and that have heights and pitches H1, H2 that are different and that vary. Naturally:

the number of helices could be greater than two;
the pitches of the helices may be different or identical;
for a given helix, its pitch may vary between the inlet and the outlet of the channel; and
the shape and the height of the obstacles may vary between helices and between the inlet and the outlet of the channel.

The positions of the crossing points between the helices may present periodicity, or no periodicity.

Figure 6:
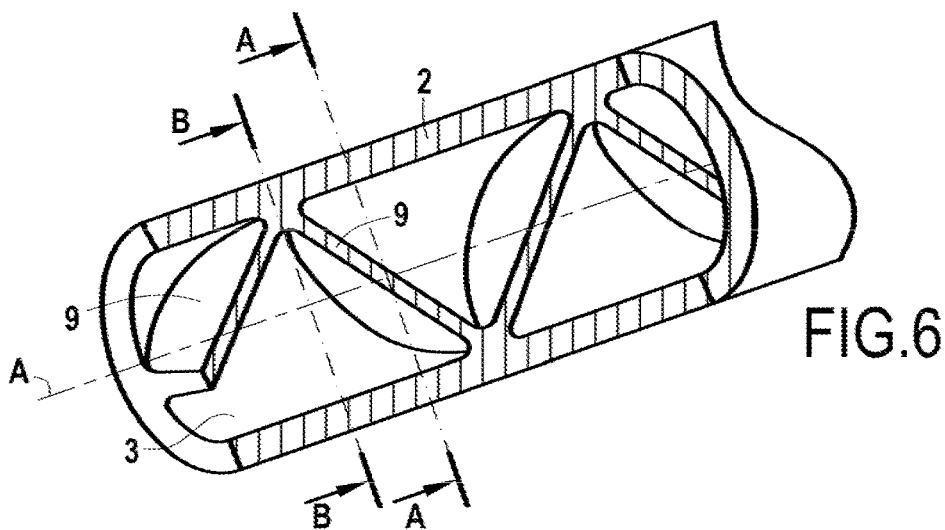
FIG. 6 is a longitudinal perspective view, partially in section, showing a separator element in which a continuous obstacle between the inlet and the outlet is formed by a succession of straight ridges projecting from the surface and inclined relative to the longitudinal axis of the channel.
Figure 6A:
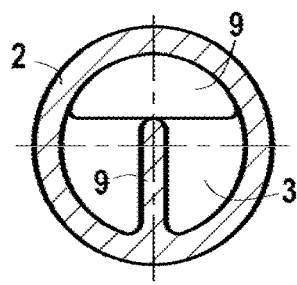
FIGS. 6A and 6B are cross section views taken respectively on lines A-A and B-B of FIG. 6.
Figure 6B:
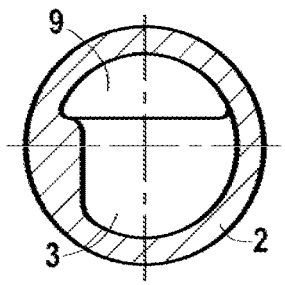

FIGS. 6, 6A, and 6B show another embodiment of a separator element in which the obstacle 9 is a succession of straight surface ridges or portions in relief that extend in inclined manner relative to the direction of the longitudinal axis A of the channel. The obstacle 9 is made up of successive rectilinear segments of heights, shapes, and inclinations that may vary. For example, the height of the obstacle is greater than the radius of the channel and the angle of inclination of these obstacle segments relative to the longitudinal axis of the channel may be greater than 0° and less than 90°, the obstacle being continuous between the inlet and the outlet of the channel.

Figure 7:
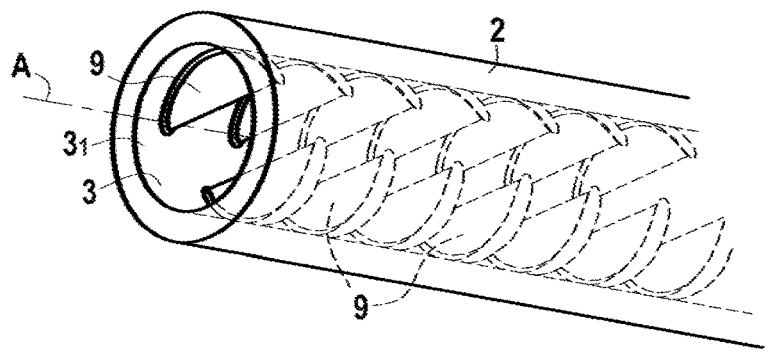
FIG. 7 is a fragmentary perspective view of a separator element in which the obstacles are ridges projecting from the surface and angularly offset from one another at 180°.
Figure 8:
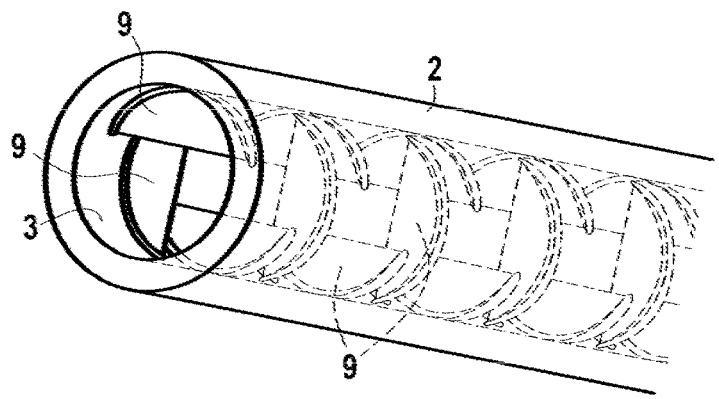
FIG. 8 is a fragmentary perspective view of a separator element in which the obstacles are ridges projecting from the surface and angularly offset from one another at 90°.

FIG. 7 shows another variant embodiment, in which the support 2 has obstacles 9 extending radially from the inside wall $3_1$ of the support, being distributed along the longitudinal axis A with a determined distribution. Each obstacle 9 is constituted by a wall, a ridge, or a portion in relief having a profile in the form of a disk sector. Preferably, the height of the obstacle is less than half the diameter of the channel 3. In the embodiment shown in FIG. 7, the obstacles 9 are arranged along the longitudinal axis while alternating by 180°, whereas in the example shown in FIG. 8, the obstacles 9 are offset in pairs by 90°.

Figure 9:
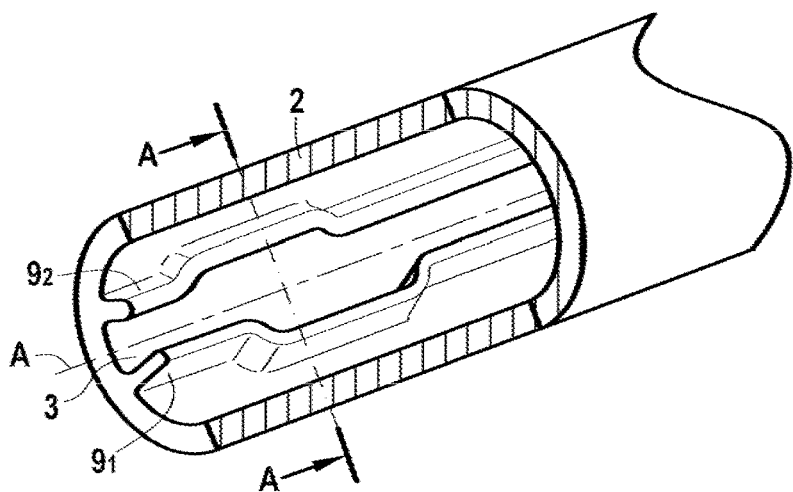
FIG. 9 is a partially cutaway view of a separator element in which continuous obstacles between the inlet and the outlet of the channel contribute to creating baffles.
Figure 9A:
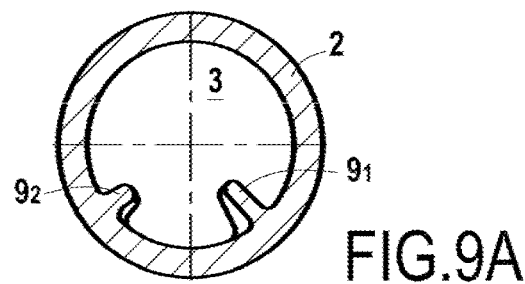
FIG. 9A is a cross-section view of the separator element on lines A-A of FIG. 9.

FIGS. 9 and 9A show another embodiment of a separator element in which the obstacles $9_1$, $9_2$ are continuous between the inlet and the outlet of the channel and contribute to creating baffles. In this variant embodiment, the two surface obstacles $9_1$, $9_2$ are non-rectilinear and constituted by a straight ridges having two different heights and zigzagging on the wall in order to form random baffles.

In the context of the invention, the porous support, or indeed the tangential flow separator element as a whole, is fabricated by using an additive technique. The method of the invention consists in making the three-dimensional structure of the support by forming individual plies that are superposed and bonded to one another in succession so as to build up the three-dimensional structure of the support progressively.

Compared with prior techniques, the method has the advantage of making the support in a single production step without requiring any tooling or machining, and thus giving access to a wider range of shapes for the support and making it possible to vary the shapes and the dimensions of the obstacles within the channels.

When using a solid material such as a powder, the thickness of the powder bed and thus the thickness of each successively consolidated ply is relatively small so as to enable it to be bonded to the underlying ply, by applying energy or by spraying liquid. In particular, the powder is deposited at a thickness lying in the range 20 µm to 200 µm, which thickness is a function of the additive technique that has been selected.

It is the repetition of the binary sequence that makes it possible, ply after ply, to construct the desired three-dimensional shape. The consolidation pattern can vary from one ply to another. The desired three-dimensional shape is built up along a selected build-up axis.

The grain size of the deposited powder is one of the factors that determines the minimum thickness for each bed of powder, as is the mean diameter of the pores that are finally obtained. In particular, the powder used is a powder of the material that is to constitute the support, e.g. a metal oxide powder, or else a powder of one of its precursors. By way of example, the deposited powder may present a mean grain size of about 35 µm in order to obtain a mean pore diameter within the ceramic support of about 10 µm.

The Applicant has found that by adjusting various parameters such as the selected material, and for a given material, the mean grain size of the powder used, and for a given material and a given grain size, the thickness of the powder bed that is repeated layer after layer, and also by adjusting the various parameters specific to the technology selected for consolidation, it is possible to obtain a residual interconnected pore texture within the consolidated monolith in a manner that is well-controlled. This residual pore texture is the result of controlled sintering of the powder grains so as to leave interconnected voids between the grains.

When using an energy beam, the main parameters on which it is possible to act are its focus, i.e. the diameter of the beam where it impacts the bed of powder, the speed with which the bed of powder is scanned by the beam of photons or of electrons, and indeed the percentage overlap between impact areas of the energy beam while constituting a ply.

When using liquid spraying, the main parameters on which it is possible to act are the weight of the drops, their frequency, the speed with which the powder bed is scanned by the "jet" of drops, and indeed the percentage overlap during successive passes.

The Applicant has also observed that, by modulating the various above-described parameters, it is possible to adjust the size distribution of the pores, and for each given population of pores, to control the number and the tortuosity of the pores.

Once the powder has agglomerated in the selected zones, the non-agglomerated material is eliminated by any appropriate technique. The initial fluidity of the powder used facilitates this operation. It is also possible to use water jet techniques or vibration to remove the last traces of powder remaining on the surface of the shape that has been made.

The final consolidation of the filter element and the final state of the porous texture are usually obtained by one or more subsequent heat treatments for the purpose of eliminating binders (de-binding) and/or of subjecting the material to sintering proper. The temperature selected for such final sintering is a function of the nature of the inorganic material used and of the mean grain size of the powder used.

The support, or indeed the entire tangential flow separator element, is thus built up ply after ply. To do this, computer-assisted design (CAD) software is used before starting to subdivide the three-dimensional structure of the support or of the tangential flow separator element that is to be made into slices. The virtual three-dimensional object that is to be made is thus subdivided into two-dimensional slices of very small thickness. These thin slices are then made one by one, in the form of individual plies that are superposed and bonded together so as to build up the desired three-dimensional shape progressively.

This three-dimensional structure is made:
either by repeating the following steps:
making a bed of solid material (organic or inorganic powder) or of liquid material (organic precursor or liquid in which a powder is dispersed, which powder may be organic or inorganic) that is to form the porous support, the bed being of constant thickness over an area greater than the section of said porous support taken at the level of the ply; and
localized consolation of some of the material to form a pattern that is determined for each ply, so as to create the individual ply, while simultaneously bonding the individual ply as made in this way to the preceding ply;
or by creating successive beads of material formed by melting an organic or inorganic powder sprayed into the beam of a laser so as to form the predetermined pattern for each ply;
or else by continuous or discontinuous (dropwise) melting of a string of a thermofusible solid precursor. When the precursor is a thermofusible organic polymer used on its own, the support is of organic nature and can be used immediately for depositing a layer of organic nature. When the precursor is a mixture of a thermofusible organic polymer and of a ceramic or metallic inorganic powder, then after the polymer used as a binder has been eliminated and after the grains of the inorganic powder have been sintered, the support is of inorganic nature.

In general manner, in the first situation, the material used is either solid or liquid, and individual plies are consolidated by delivering energy or by spraying a liquid in fine droplets. Energy may be delivered in localized manner by using a directed light beam (by light-emitting diode (LED) or by laser) or by using a beam of directed electrons, or indeed by using any energy source that can be focused and scanned over the bed of powder in the pattern selected by CAD. Interaction between the energy and the material then gives rise, either to sintering, or to the material melting and solidifying, or indeed to the material being subjected to photo-polymerization or photo-cross-linking, depending on its nature and on the nature of the energy source used.

Liquid may be delivered in localized manner using micro droplets created by means of a piezoelectric system, which droplets may optionally be charged and directed using an electrostatic field. The liquid should be a binder or an agent for activating a binder that has previously been added to the ceramic powder.

Compared with prior techniques, the use of an additive technique as envisaged in the context of the invention makes it possible firstly to obtain an improvement in terms of production reliability and rate, and secondly to obtain a wide range of support shapes and of shapes for portions in relief that can be formed in the channel(s) inside the support.

In the context of the invention, various additive techniques can be used for designing the three-dimensional shape, as described below.

Selective Laser Sintering (SLS) or Selective Laser Melting (SLM)

With this technique, a powder of the material that is to constitute the support or the tangential flow separator element, an organic powder, or preferably a powder of inorganic material made of metal or of a ceramic of oxide, nitride, or carbide type, or indeed a powder for a precursor thereof, is deposited so as to form a continuous bed. A powerful laser beam is then applied locally in the selected pattern and serves to agglomerate the powder so as to form the ply corresponding to the support or to the tangential flow separator element, and to bond it to the preceding ply by sintering. Under the effect of localized energy delivery, the powder grains melt in part and become welded together, thereby making the ply cohesive, and thus performing pre-sintering of the shape that is being made. Thereafter, a new powder bed is spread and the process begins again.

The laser beam scans the surface of the powder so as to consolidate the material in the desired pattern, ply by ply. The scanning is performed by moving the laser along parallel paths. It may be advantageous for the impact areas of the laser to overlap between two successive parallel paths. The quantity of energy received by the powder bed at the location of the impact of the laser beam must be such that the melting of the powder grains remains partial, or in any event such that each grain melts sufficiently to become bonded with its closest neighbors without closing the porous texture.

The adjustments of the machine thus depend in particular on the intrinsic characteristics of the powder bed and of the nature of the material that define the effectiveness of the interaction between photons and material.

By way of indication, it is possible to use the conditions corresponding to the ranges set out in Table 1 below:

TABLE 1

| | Min | Max |
|---|---|---|
| Mean grain size of the ceramic powder | 10 μm | 100 μm |
| Thickness of the powder bed | 40 μm | 200 μm |
| Power of the laser | 500 watts (W) | 1000 W |
| Travel speed of the laser | 0.5 meters per second (m/s) | 10 m/s |

By locally adjusting the focus of the laser beam and/or the travel speed of the beam, it is possible to adjust the quantity of energy that is received by the powder bed, and thus to adjust the resulting densification of the ceramic material, thereby adjusting its porous texture. It is thus possible, at certain locations, to obtain a porous texture corresponding to that desired for the filter separator layer, and at other locations, to obtain a porous texture corresponding to that desired for the support.

Although sintering is performed progressively while building up the support or the tangential flow separator element by applying the laser, it is advantageous to make use of a final sintering step after the support or the tangential flow separator element has been fully built, in order to release the residual mechanical stresses and make the porous texture more uniform. The temperature selected for such final sintering should be a function of the nature of the inorganic material used and of the mean grain size of the powder used, for example, when using titanium oxide, a temperature in the range 1300° C. to 1500° C. should be used.

It should be observed that the above-described selective melting of powder can be obtained in analogous manner by an electron beam, which corresponds to the electron beam melting (EBM) technique.

3D Printing

The principle remains the same, but with printing the deposited plies may correspond to a powder mixture that may be organic or inorganic, ceramic or metallic, which powder may be the material constituting the support, or a precursor of that material, together with a binder, which may itself be in the form of a powder or of a coating on the inorganic powder itself. Preferably, the mixture is uniform and the particles of the powder of the material constituting the support or a precursor for that material, and the particles of the binder present sizes that are similar. As examples of binders, mention may be made of furan, phenolic, and amino resins. The percentage by weight of binder should lie in the range 1% to 25% depending on its nature and on the mean diameter of the powder used. Thereafter, an agent for activating the binder is sprayed in the form of very fine droplets in the selected pattern and causes the powder to agglomerate locally. The activator agent may be a solvent for the binder, which after drying almost instantaneously, serves to bind the inorganic particles together adhesively or to imprison them inside a solid lattice.

It is also possible to deposit only an organic or inorganic, ceramic or metal powder of the material that is to constitute the support, or a powder of a precursor thereof, in order to form a continuous bed, and then to spray a binder locally, which binder should then be a fast-drying liquid adhesive or a thermosetting liquid resin.

Binder or activator agent in liquid form is sprayed by using any appropriate device, and in particular a piezoelectric system of the kind used in inkjet type printers, with scanning that can be implemented by moving a print head along parallel paths. It may be advantageous for the impact areas of the drops to overlap between two successive parallel paths.

After eliminating the powder that has not been agglomerated, the binder is eliminated during the sintering heat treatment, this debinding usually coming to an end before reaching 500° C.

With the grains of the ceramic powder having a mean size lying in the range 30 μm to 100 μm, 3D printing makes it possible to make the powder bed at a thickness lying in the range 80 μm to 300 μm and to reach linear construction speeds for the desired shape lying in the range 25 millimeters per hour (mm/h) to 100 mm/h.

Lithography-Based Ceramic Manufacturing (LCM)

LCM is a technique in which the ceramic powder is pre-mixed with a photo-polymerizable resin, with the consolidation by polymerization being obtained using an LED or laser light source. As in the above-described techniques, it is necessary to eliminate the non-cross-linked powder before the sintering heat cycle that serves to remove binder, i.e. to eliminate the proto-polymerizable resin followed by sintering proper.

The use of LCM is limited by the fact that the powder grains must be transparent at the wavelengths under consideration in order to achieve bulk polymerization under and around the impact point of the light.

Fused Deposition Modeling (FDM)

FDM is a technique using a thermofusible solid organic polymer optionally having an inorganic powder added thereto. This technique seeks to create successive deposits of beads of material from a string or a tape. The bead of material is made by softening or melting the end of the string or tape, either continuously (extrusion), or discontinuously (drops). Unlike the above-described techniques, there is no prior formation of a bed of material. The plies or beads of material are consolidated by heating.

In a variant of this technique, provision may be made to spray an inorganic powder in order to create successive beads of material, with the powder being sprayed into a laser beam so as to melt before impact.

Stereolithography Using Stereolithography Apparatus (SLA)

This technique, which is similar in principle to the above-described techniques, makes use of a liquid material as a photocurable liquid precursor having an inorganic powder incorporated therein. The beam of photons (LED or laser) scans the layer of liquid and polymerizes it locally.

With 3D printing or LCM, the filter separator layer(s) is/are deposited after the support has been made, after the final sintering operation. A separator layer is deposited, in particular on the surfaces of the channels and the obstacles in the channels of the support, by depositing thereon a suspension containing at least one sinterable composition that is to constitute a filter layer after baking. Such a composition presents a constitution as conventionally used in the production of inorganic filter membranes. The composition contains at least one oxide, nitride, carbide, or other ceramic material, or a mixture thereof, with metallic oxides, nitrides, and carbides being preferred. The sinterable composition is put into suspension, e.g. in water. In order to eliminate the risk of aggregates being present and in order to optimize the dispersion of grains in the liquid, the resulting suspension is milled in order to destroy aggregates and obtain a composition that is made up essentially of individual particles. The rheology of the suspension is then adjusted with organic additives in order to satisfy the hydrodynamic requirements for penetrating into the channels of the supports. Once the layer has been deposited, it is dried, and then sintered at a temperature that depends on its nature, on the mean size of its grains, and of the intended cut-off threshold.

With SLS or SLM, the separator filter layer(s) may be generated simultaneously with building up the support, or they may be deposited subsequently using the conventional deposition methods that are used in membrane production. Once more, the separator filter layer(s) may be deposited from suspensions of particles of the inorganic material that is to be deposited, or of a precursor thereof. Such suspensions are conventionally used in the production of ceramic filter elements. After drying, the or each layer is subjected to a sintering operation that serves to consolidate layers and to bind them to the surface on which they have been deposited. The grain size of the particles present in the suspension is a function of the final desired porous texture for the separator filter layer.

The following examples illustrate the invention, but they have no limiting character.

Tubular elements for tangential flow separation, of the type shown in the figures, were fabricated in accordance with the invention. The support was in the form of a tube having a length lying in the range 300 mm to 1200 mm, of circular right cross-section, and presenting a diameter lying in the range 10 mm to 42 mm and in which a rectilinear channel was formed parallel to the axis of the tube.

EXAMPLE 1: SLS/SUPPORT ONLY

| Material | Titanium oxide |
| --- | --- |
| Mean grain size of the ceramic powder | 35 µm-45 µm |
| Thickness of the powder bed | 50 µm |
| Focusing (diameter of the laser beam at the point of impact with the powder) | 240 µm |
| Atmosphere of the chamber | Air |
| Power of the laser | 200 W |
| Travel speed of the laser | 0.8 m/s |
| % overlap between two laser passes | 15%-25% |
| Final sintering temperature | 1380° C. |
| Duration of the pause at 1380° C. | 2 hours (h) |
| Mean diameter of the resulting pores | 20 µm-30 µm |

EXAMPLE 2: SLS/SUPPORT+LAYER

| Material | Titanium oxide | |
| --- | --- | --- |
| Mean grain size of the ceramic powder | 25 µm-35 µm | |
| Thickness of the powder bed | 40 µm | |
| Focusing (diameter of the laser beam at the point of impact with the powder) | 120 µm | |
| Atmosphere of the chamber | Air | |
| Power of the laser | 200 W | |
| | Support | Separator layer |
| Travel speed of the laser | 0.8 m/s | 1 m/s |
| % overlap between two laser passes | 20%-25% | |
| Final sintering temperature | 1380° C. | |
| Duration of pause at 1380° C. | 2 h | |
| Mean diameter of the resulting pores | 20 µm-30 µm | 1 µm-2 µm |

EXAMPLE 3: SLS/SUPPORT ONLY

| Material | Silicon carbide |
| --- | --- |
| Mean grain size of the ceramic powder | 75 µm-80 µm |
| Thickness of the powder bed | 120 µm |
| Focusing (diameter of the laser beam at the point of impact with the powder) | 120 µm |
| Atmosphere of the chamber | Argon |
| Power of the laser | 200 W |
| Travel speed of the laser | 0.6 m/s |
| % overlap between two laser passes | 30%-35% |
| Mean diameter of the resulting pores | 25 µm-30 µm |

Under such circumstances, no final sintering is necessary.

EXAMPLE 4: 3D PRINTING

| Material | Titanium oxide |
| --- | --- |
| Mean grain size of the ceramic powder | 30 µm-35 µm |
| Thickness of the powder bed | 80 µm |
| Type of binder | Furan resin |
| % of binder | 20% |
| Linear construction speed of the shape | 30 mm/h |
| Final sintering temperature | 1500° C. |
| Duration of the pause at 1500° C. | 6 h |
| Mean diameter of the resulting pores | 10 µm-12 µm |

In examples 1, 3, and 4, fabrication of the tangential flow separator element was finished off by depositing a separator layer on the surface of the channel by using the following suspension:

Preparation of the Suspension by Milling in a Ball Mill

| Material | Titanium oxide |
| --- | --- |
| Mean grain size of the powder before milling | 3.6 µm |
| Titanium oxide/water ratio | 0.4 |
| Duration of milling | 5 h |
| Mean grain size of the powder after milling | 1 µm |
| Add water to adjust rheology | 200 centipoise (cps) to 400 cps |

A microfiltration separator layer having a cut-off threshold of 1.4 µm was obtained after direct deposition on the support performed in the following manner.

The suspension was caused to penetrate into the channel by pumping in order to put it into contact with the surface of the channel. The mechanism driving deposition was the liquid from the suspension being attracted through the pores of the porous support.

The thickness of the deposit of titanium oxide particles on the surface, and thus the weight deposited per unit area depends on the time spent by the suspension in the channel of the support.

| Time spent by the suspension in the channels | 30 seconds |
| --- | --- |
| Weight deposited in grams per square meter (g/m$^2$) | 50 g/m$^2$ to 60 g/m$^2$ |

The operation was repeated twice to reach a final deposited weight of about 110 g/m$^2$.

Baking Cycle for Sintering the Layer

| Rate of temperature rise up to 1200° C. | 100° C./h |
| --- | --- |
| Duration of the pause at 1200° C. | 1 h |
| Natural cooling | |

Tangential flow microfiltration separator elements having cut-off thresholds of less than 1.4 µm and tangential flow ultrafiltration and nanofiltration separator elements can be fabricated by making successive deposits on such a first layer, while using increasingly fine suspensions in association with appropriate heat treatment cycles.

The invention is not limited to the examples described and shown, since various modifications can be made thereto without going beyond the ambit of the invention.

The invention claimed is:

1. A tangential flow separator element for separating a fluid medium for treatment into a filtrate and a retentate, said separator element comprising a monolithic rigid porous support of rectilinear structure with a single channel having a wall that is continuously covered by a separation layer, said channel being formed therein for passing a flow of the fluid medium for treatment between an inlet and an outlet for the retentate, in order to recover a filtrate from the peripheral surface of the support, the outside surface of the support presenting a profile that is constant,
wherein the monolithic rigid porous support defines obstacles to the flow of the fluid for filtering, which obstacles extend from the inside wall of said channel, are identical in material and porous texture to the support, and present continuity of material and of porous texture with the support,
wherein said obstacles generate variations in the flow section of the channel, and
wherein the variations in the flow section of the channel result from a variation in at least one of the following criteria along a longitudinal axis of the channel: an area of a right section of the channel, a shape of the right section of the channel, and a dimension of the right section of the channel.

2. The tangential flow separator element according to claim 1, comprising at least one separator layer deposited continuously on the inside wall of the channel and completely covering the obstacles.

3. The tangential flow separator element according to claim 1, wherein the obstacles comprise discontinuous portions in relief formed on the inside wall of the channels.

4. The tangential flow separator element according to claim 3, wherein the discontinuous portions in relief extend transversely inside the channel from one portion of the channel to another.

5. The tangential flow separator element according to claim 4, wherein the obstacles define internal ducts for passing a flow of permeate and leading to the peripheral surface of the support.

6. The tangential flow separator element according to claim 1, wherein the obstacles comprise portions in relief formed on the inside wall of the channel, which portions in relief extend continuously between the inlet and the outlet.

7. The tangential flow separator element according to claim 1, wherein, relative to the maximum flow section of the channel, the obstacles generate a reduction in the area of the flow section lying in the range of 1% to 50%.

8. The tangential flow separator element according to claim 1, wherein the obstacles have their surfaces that are for coming into contact with the fluid for filtering and that face towards the inlet sloping in the flow direction of the fluid for treatment.

9. The tangential flow separator element according to claim 1, wherein the porous support is made of a material that is organic or inorganic.

10. The tangential flow separator element according to claim 1, comprising a porous support and at least one separator layer continuously deposited on the inside wall of the channel and completely covering the obstacles, each being constituted of a ceramic selected from: oxides, nitrides, carbides, and other ceramic materials, and mixtures thereof.

11. The tangential flow separator element according to claim 1, wherein the support presents a mean pore diameter lying in the range of 4 µm to 40 µm.

12. The flow separator element according to claim 11, wherein the mean pore diameter corresponds to a d50 value for the volume distribution at which 50% of the total volume of the pores corresponds to the volume of the pores having a diameter less than the d50 value; the volume distribution being obtained by mercury penetration.

13. A method of fabricating a tangential flow separator element according to claim 1, wherein the three-dimensional structure of the monolithic rigid porous support of rectilinear structure with a single channel is made by forming individual plies that are superposed and successively bonded to one another so as to build up the desired three-dimensional shape progressively.

14. The method according to claim 13, comprising making the three-dimensional structure by repeating the following steps:
making a continuous bed of a material that is to form the porous support, the bed being of constant thickness over an area greater than the section of said porous support at the ply;

locally consolidating some of the material to form a pattern that is determined for each ply, so as to create the individual ply while simultaneously bonding the individual ply as made in this way to the preceding ply.

15. The method according to claim 13, comprising making continuous beds of a solid material in the form of a powder or a liquid material.

16. The method according to claim 15, wherein the liquid material is photopolymerizable resin.

17. The method according to claim 13, comprising making a continuous bed of a solid material in the form of an organic or inorganic powder.

18. The method according to claim 13, comprising making a continuous bed of a medium in the form of a photopolymerizable liquid precursor having an inorganic powder disposed therein.

19. The method according to claim 13, wherein each ply is made by continuous or discontinuous melting of a string of a thermofusible solid precursor that is either a thermofusible organic polymer used on its own with an organic support and an organic layer, or a mixture of a thermofusible organic polymer and of a ceramic inorganic powder, with a support having an inorganic nature.

20. The method according to claim 13, comprising creating successive beads of material by spraying a powder that is melted in a laser beam.

21. The tangential flow separator element according to claim 1, comprising a porous support and at least one separator layer continuously deposited on the inside wall of the channel and completely covering the obstacles, each being constituted of a ceramic selected from the group consisting of titanium oxide, aluminum oxide and zirconium oxide and mixtures thereof, titanium nitride, aluminum nitride, boron nitride, and silicon carbide.

22. The tangential flow separator element according to claim 1, characterized in that it comprises a porous support and at least one separator layer continuously deposited on the inside wall of the channel and completely covering the obstacles, each being constituted of a ceramic selected from the group consisting of oxides, nitrides, carbides, and other ceramic materials, and mixtures thereof, mixed with another ceramic material.

* * * * *